United States Patent [19]

MacLeay et al.

[11] Patent Number: 5,037,894
[45] Date of Patent: Aug. 6, 1991

[54] POLYMER BOUND FLAME RETARDANTS

[75] Inventors: Ronald E. MacLeay; Terry N. Myers, both of Williamsville, N.Y.

[73] Assignee: Atochem North America, Inc., Philadelphia, Pa.

[21] Appl. No.: 267,610

[22] Filed: Nov. 7, 1988

[51] Int. Cl.$^5$ .............................................. C08F 8/32
[52] U.S. Cl. .............................. 525/327.6; 525/329.6; 525/375; 525/376
[58] Field of Search ................... 525/327.6, 329.6, 375, 525/376

[56] References Cited

U.S. PATENT DOCUMENTS

| | | |
|---|---|---|
| 2,769,804 | 11/1956 | Hanson . |
| 2,971,939 | 2/1961 | Baer . |
| 2,989,517 | 6/1961 | Hanson et al. . |
| 3,113,986 | 12/1963 | Breslow et al. . |
| 3,336,267 | 8/1967 | Zimmerman et al. . |
| 3,483,276 | 12/1969 | Mahlman . |
| 3,488,311 | 1/1970 | Burdick et al. . |
| 3,509,110 | 4/1970 | Di Giulio et al. . |
| 3,553,177 | 1/1971 | Hazen et al. . |
| 3,555,001 | 1/1971 | Wallis et al. . |
| 3,560,455 | 2/1971 | Hazen et al. . |
| 3,560,456 | 2/1971 | Hazen et al. . |
| 3,560,457 | 2/1971 | Hazen et al. . |
| 3,632,561 | 1/1972 | Gibb et al. . |
| 3,639,334 | 2/1972 | Holoch . |
| 3,723,375 | 3/1973 | Field et al. . |
| 3,755,354 | 8/1973 | Holub et al. . |
| 3,884,882 | 5/1975 | Caywood, Jr. . |
| 3,887,518 | 6/1975 | Rosenberger et al. . |
| 3,919,354 | 11/1975 | Moore et al. . |
| 3,956,331 | 9/1976 | Yoshikawa et al. . |
| 3,998,907 | 12/1976 | DiGiulio . |
| 4,032,509 | 6/1977 | Lee . |
| 4,051,311 | 9/1977 | Lee . |
| 4,059,545 | 11/1977 | Corbett et al. . |
| 4,097,551 | 6/1978 | DiGiulio et al. . |
| 4,108,943 | 8/1978 | Lee . |
| 4,147,689 | 4/1979 | Thompson . |
| 4,226,952 | 10/1980 | Halasa et al. . |
| 4,341,695 | 7/1982 | Lee et al. . |
| 4,381,373 | 4/1983 | Ikuma . |
| 4,465,571 | 8/1984 | Hansen . |
| 4,486,570 | 12/1984 | Lordi et al. . |
| 4,506,056 | 3/1985 | Gaylord . |
| 4,508,874 | 4/1985 | Hergenrother et al. . |
| 4,508,883 | 4/1985 | Younes . |
| 4,522,983 | 6/1985 | Le-Khac et al. . |
| 4,522,992 | 6/1985 | Verbrugge . |
| 4,544,682 | 10/1985 | Corbert et al. . |
| 4,578,409 | 3/1986 | Krishnan et al. . |
| 4,604,422 | 8/1986 | Younes . |
| 4,609,711 | 9/1986 | Younes . |
| 4,692,486 | 9/1987 | Gugumus . |
| 4,868,246 | 9/1989 | MacLeay et al. ................. 525/327.6 |

FOREIGN PATENT DOCUMENTS

| | | |
|---|---|---|
| 1180497 | 1/1985 | Canada . |
| 171593 | 2/1978 | Czechoslovakia . |
| 55-120654 | 9/1980 | Japan . |
| 59-221314 | 12/1984 | Japan . |
| 59-221315 | 12/1984 | Japan . |
| 207683A | 12/1981 | United Kingdom . |

OTHER PUBLICATIONS

J. R. Fried et al., "Compatibility of Poly(2,6-dimethyl-1,4,-phenyene oxide) (PPO)/Poly(styrene-co-4--chlorostyrene) Blends. I. Differential Scanning Calorimetry and Density Studies", Macromolecules, vol. 11, No. 1, pp. 150–158 (Jan.-Feb. 1978).

Kirk-Othmer, "Flame Retardants (Halogenated)-Additive Flame Retardants", Encyclopedia of Chemical Technology, 3rd Ed., vol. 10, pp. 384–387 (John Wiley & Sons).

Gerrit ten Brinke et al., "Phase Behavior in Copolymer Blends: Poly)2,6-dimethyl-1,4-phenylene oxide) and Halogen-Substituted Styrene Copolymers", Macromolecules, vol. 16, pp. 1827–1832 (1983).

G. DeVito et al., "Functionalization of an Amorphous Ethylene-Propylene Copolymer by Free Radical Initiated Grafting of Unsaturated Molecules", Journal of Polymer Sci.: Polym. Chem. Ed., vol. 22, pp. 1335–1347 (1984).

Primary Examiner—Bernard Lipman
Attorney, Agent, or Firm—Panitch Schwarze Jacobs & Nadel

[57] ABSTRACT

Polymeric flame retardants comprise halognenated aromatic compounds having acylamino functional groups which are chemically bonded to cyclic imide-containing or imide-forming polymers or copolymers. The polymeric flame retardants are prepared by the reaction of halogenated aromatics containing a reactive hydroazido group with some or all of the anhydride groups of an cyclic alpha, beta-unsaturated dicarboxylic acid anhydride polymer or copolymer to form pendant halogenated-aromatic-substituted imide or amic acid groups. In addition, polymeric flame retardants are used to render thermoplastic resin less flammable under conditions which promote combustion. Novel flame retardant hydrazides are disclosed.

18 Claims, No Drawings

POLYMER BOUND FLAME RETARDANTS

BACKGROUND OF THE INVENTION

1. Field of the Invention

The present invention relates to polymeric flame retardants and, more particularly, to cyclic imide or cyclic imide-forming polymers or copolymers bearing halogenated aromatic substituents and methods for preparing the same. Further, the present invention is directed to methods for inhibiting ignition of polymers or polymer blends under conditions which promote combustion by inclusion of these polymeric flame retardants.

2. Description Of The Prior Art

Three factors typically affect the performance of a flame retardant additive in a polymer composition: (1) the intrinsic activity of the flame retardant on a molar basis; (2) the compatibility or solubility of the flame retardant in the polymer system; and (3) the ability of the flame retardant to remain in the polymer system. Of these factors, the third is generally most problematic. Conventional flame retardants tend to volatilize or migrate from the polymer system, thereby lowering the flame retardancy of the system.

One popular approach to solving the volatility and migration problems of the flame retardants has been to use brominated or chlorinated monomers in the polymerizations or copolymerizations. French Demande 2,406,644 (Chem. Abst. 91, 158528s), for example, discloses the preparation of fire resistant foams by foaming maleic anhydride-styrene-(2,4,6-tribromophenoxy)ethyl methacrylate copolymer or ar-bromostyrene/maleic anhydride copolymer. German Offenlegungsschrift 2,659,174 (Chem. Abst. 87, 118404j) discloses flame retardant copolymers of styrene, maleic anhydride and bromophenyl or bromoneopentyl (meth)acrylate. Czech Patent 171,593 (Chem. Abst. 89, 108730q) discloses halo derivatives of N-phenylmaleimide which are useful as comonomers in the preparation of polymers with reduced combustibility.

Copolymers containing various ratios of bromostyrenes and styrene are also well known in the literature and have been used in blends with poly(phenylene oxide) to improve the fire resistance (see French Demande 2,483,443, (Chem. Abst. 96, 163728q) for example). Copolymers of styrene and chlorostyrenes have also been blended with poly(phenylene oxide) to increase the fire resistance of the polymer blends (see Fried, J. R., et al., *Macromolecules*, 11:150 (1978)). Rubber modified styrene-bromostyrene copolymers are also known (see, for example, Japanese patent publication 80,120,654 Kokai Tokyo Koho (Chem. Abst. 94, 85128m)) and have been blended with poly(phenylene oxide) to increase fire resistance.

A problem arises, however, when halogenated monomers are incorporated into the copolymer. The physical properties of the halogenated copolymer are changed relative to the unhalogenated homopolymer. Further, in many cases, the copolymer has limited or no compatibility with the polymer in which it is blended. Consequently, the desirable physical properties of the polymer blend are destroyed or degraded by incorporation of the halogenated monomer (see Ten Brinke, G., et al., *Macromolecules* 16:1827 (1983)). In addition, the use of a halogenated monomer is often unsatisfactory in commercial practice because it requires, as a first step, the halogenation of the monomer. This separate step is costly and inconvenient.

Flame retardant compositions containing styrene-N-halogenated maleimides are known and are described generally in U.S. Pat. Nos. 4,508,883; 4,604,422; and 4,609,711, issued to U. E. Younes. U.S. Pat. No. 4,508,883, for example, discloses a flame retarding additive prepared by copolymerizing a brominated styrene and an N-(brominated phenyl)maleimide.

U.S. Pat. No. 4,604,422 discloses a moldable composition which comprises random N-(brominated or chlorinated phenyl)maleimide containing copolymers. The copolymers are prepared by copolymerizing an N-(brominated or chlorinated phenyl)maleimide with a monomer, such as styrene or substituted styrene, and, if desired, an alpha, beta-unsaturated dicarboxylic anhydride. Rubber may be grafted onto these polymers during the preparation. The copolymers are blended with polycarbonate to produce flame retardant compositions.

U.S. Pat. No. 4,609,711 discloses a moldable composition which comprises a random N-(halogenated phenyl)maleimide containing copolymer and a flame retardant synergist. The copolymers are prepared by copolymerizing an N-(brominated or chlorinated phenyl)maleimide with a monomer, such as styrene or substituted styrenes and, where desired, a suitably substituted maleimide.

The compounds and compositions of the Younes patents are not known to be commercially available. The flame retardant compounds of the Younes patents are prepared by first reacting maleic anhydride with the corresponding halogenated aniline in the presence of zinc chloride at 139° to 148° C. for about 2 hours and isolating the N-(brominated or chlorinated phenyl)maleimides by extraction into xylene. The maleimides are subsequently copolymerized with vinyl monomers to form the flame retardant polymers. The N-(brominated or chlorinated phenyl)maleimide containing copolymers are not prepared by reaction of the halogenated aniline with the corresponding anhydride containing polymer. This is due to the poor reactivity of halogenated anilines with the anhydride containing copolymers (especially when there is more than one halogen on the aniline).

Dow Chemical Company avoided the problem of the poor reactivity of the halogenated anilines by using brominated primary aliphatic amines. U.S. Pat. No. 4,544,682, for example, discloses flame retardant polymeric compositions containing copolymers of a styrenic monomer and a maleimide having a bromine substituted aliphatic hydrocarbon radical appended to the nitrogen atom. The flame retardant compositions are formed by melt blending copolymers of styrenic monomers and maleic anhydride with brominated primary aliphatic amines. The preferred brominated primary aliphatic amine was 2,4,5-tribromobenzylamine, which is not known to be commercially available.

Halogenated aromatic compounds containing a hydrazide functionality are known in the art. For example, N-(halophenyl)-N'-aminooxamides are known and described generally in Chemical Abstract registry numbers (RN) 17739-01-4 (3,4-dichloro), RN 60199-81-7 (4-bromo), RN 53117-25-2 (2-chloro), RN 53117-26-3 (3-chloro), RN 53117-27-4 (4-chloro), and RN 53117-31-0 (3,5-dichloro). However, none have been reacted with anhydrides, either monomeric or polymeric.

In addition to the flame retarding properties of the polymeric flame retardants of the present invention, the acylhydrazido linkage created by the reaction of the hydrazide group of the halogenated aromatic group and an anhydride group of the polymer or copolymer to form the polymeric flame retardant contributes permanent heat stabilizing and metal deactivating properties to the polymer. These properties arise from the structure of the group formed during attachment, i.e., acylhydrazido and N-(acylamino)imide functional groups.

Acylhydrazido functions, for example, are known to be particularly useful antioxidants (see, e.g., U.S. Pat. No. 3,639,334) and also act as metal deactivators by chelating metal ions, such as copper ions, (U.S. Pat. Nos. 4,147,689; 4,465,571 and 3,887,518). N-(aroylamino)imides are also known stabilizers of polyolefins against degradation by heavy metals (see U.S. Pat. No. 3,956,331).

Nothing in the prior art, however, discloses or suggests attaching flame retardant groups to anhydride-containing polymers or copolymers by hydrazido linkages between the flame retardant groups and some or all of the anhydride groups. Likewise, nothing discloses or suggests any flame retardant polymers where halogenated aromatic groups are attached to polymers by pendant acylhydrazido or N-(acylamino)imide groups.

SUMMARY OF THE INVENTION

Contrasted with the prior art having the above-indicated deficiencies and inefficiencies, polymeric flame retardants of the present invention comprise recurring units of N-(acylamino)amic acid or cyclic N-(acylamino)imide or both, wherein the recurring units include an acylamino group and a halogenated aromatic flame retardant group linked to the acylamino group. In general, the halogenated aromatic flame retardant group may be linked to the acylamino group by a direct bond between the halogenated aromatic flame retardant group and the carbon of the acylamino group, or by an indirect linking attachment, involving intermediate constituents between the halogenated aromatic flame retardant group and the carbon of the acylamino group. Suitable intermediate linking constituents include those constituents indicated in Formulas IV and V below.

More particularly, the polymeric flame retardants comprise chlorinated, brominated or fluorinated aromatic flame retardant groups, each including a hydrazido group, which are chemically bonded to polymers or copolymers of cyclic alpha, beta-unsaturated dicarboxylic acid anhydrides where the reaction of the anhydride groups and the hydrazido groups forms an acylhydrazido linkage.

As used herein, the prefix "halo" and the term "halogenated" will be understood to indicate the elements fluorine, chlorine or bromine, or combinations thereof.

One aspect of the present invention relates to a novel polymeric flame retardant containing recurring units having Formula I or II or both:

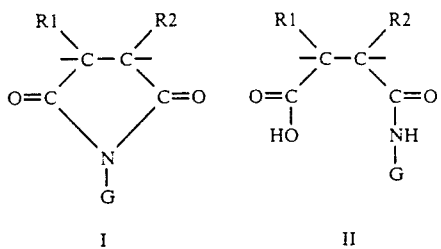

in which the units occur in the polymer backbone, as pendant units, or both, wherein R1 and R2 are independently hydrogen, an alkyl radical of 1 to 6 carbons, a cycloalkyl radical of 5 to 7 carbons, a phenyl radical, chlorine or bromine;

G is a flame retardant group attached to the unit by an acylamino functional group having linked thereto a halogenated aromatic ring.

Another aspect of the present invention is a novel flame retardant of Formula III incorporating a halogenated aromatic ring, and a reactive hydrazido functional group:

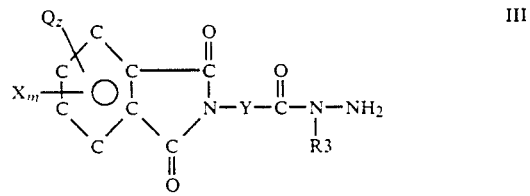

wherein m is an integer from 1 to 4;

z is an integer from 0 to 2;

R3 is hydrogen, a primary alkyl radical of 1 to 8 carbons, a secondary alkyl radical of 3 to 8 carbons, an aralkyl (arylalkyl) radical of 7 to 12 carbons or a cycloalkyl radical of 5 to 12 carbons;

Q is an alkyl radical of 1 to 4 carbons or an alkoxy radical of 1 to 4 carbons;

X is bromine, chlorine, fluorine or combinations thereof;

Y is a substituted or unsubstituted alkylene diradical of 1 to 12 carbons, a substituted or unsubstituted cycloalkylene diradical of 5 to 8 carbons, or a substituted or unsubstituted aralkylene (arylalkylene) diradical of 7 to 12 carbons. Optional substituents for the Y diradicals include an alkyl radical of 1 to 4 carbons, a carboxy radical, an alkyl mercapto radical of 1 to 4 carbons, a phenyl radical, a halogen substituted phenyl radical, an alkenyl radical of 2 to 5 carbons and a hydroxy radical.

Another aspect of the present invention is a polymeric flame retardant having recurring units comprising an N-(acylamino)amic acid or a cyclic N-(acylamino)imide or both, where the N-(acylamino)amic acid or N-(acylamino)imide is formed by a reaction between a halogenated aromatic flame retardant having a reactive hydrazido group and a polymer containing a cyclic anhydride group or a dicarboxylic acid group capable of forming a cyclic anhydride group, under conditions effective to form the N-(acylamino)amic acid or cyclic N-(acylamino)imide or both.

Yet another aspect of the present invention is a process for preparing the above-identified novel polymeric flame retardants by reacting anhydride-containing or anhydride-forming polymers with halogenated aromatic flame retardant compounds containing reactive hydrazido functional groups (i.e., those with unsubstituted terminal nitrogen). Preferably, an alternating, random or a graft copolymer of maleic anhydride is reacted with a chlorinated or brominated aromatic compound containing a reactive hydrazido functionality to form an N-substituted maleimide copolymer.

Still other aspects of the present invention are a process of preparing a flame retarded thermoplastic resin by mixing with the resin an amount of a polymeric flame retardant according to the present invention effective to provide flame retardant properties to the resin, and, in addition, the flame retarded resin so produced.

Detailed Description of Preferred Embodiments

In accordance with the presently preferred embodiments of this invention, polymeric halogenated aromatic flame retardants contain recurring units having Formula I or Formula II or both, as set forth above, in which the groups G have the general Formula IV or V, or both:

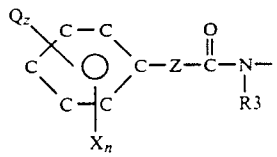

IV

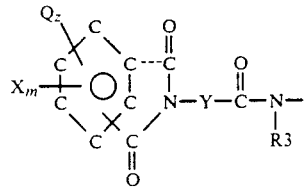

V wherein m, z, R3, Q, X and Y are as previously described;

n is an integer from 1 to 5;

Z is a direct bond, an alkylene diradical of 1 to 4 carbons, —W—, —W—R4— or —W—C(=O)—R5— where W is —O—, —S—, —N(R6)— or —N(R6)—R7—N(R6)—, the orientation of Z being such that the left end of the diradical representational formula for Z above is bonded to the halogenated aromatic flame retardant group and the right end is bonded to the carbonyl carbon of the acylamino group;

R4 is an alkylene diradical of 1 to 4 carbons;

R5 is a direct bond, an alkylene diradical of 1 to 14 carbons, an oxydialkylene diradical of 4 to 10 carbons, a thiodialkylene diradical of 4 to 10 carbons, or alkenylene diradical of 2 to 10 carbons, or an o-, m-, or p-phenylene radical;

R6 is hydrogen, an alkyl radical of 1 to 10 carbons, an aryl radical of 6 to 12 carbons, an aralkyl radical of 7 to 12 carbons, or a cycloalkyl radical of 5 to 12 carbons; and R7 is an alkylene diradical of 2 to 12 carbons.

Preferably, in Formula IV, X is bromine or chlorine, n is 2 or 3, z is 0, R3 is hydrogen or a methyl radical, Z is —W—R4— or —W—C(=O)—R5—, W is —N(R6)— or —O—, R4 is a methylene diradical or an ethylene diradical, R5 is a direct bond or an ethylene diradical, and R6 is hydrogen or a methyl radical. More preferably, X is bromine, n is 3, R3 is hydrogen, Z is —W—C(=O)—R5—, W is —N(R6)—, R5 is a direct bond and R6 is hydrogen.

Preferably, in Formula V, X is bromine or chlorine, m is 3 or 4, z is 0, R3 is hydrogen or methyl and Y is an alkylene diradical of 1 to 6 carbons. More preferably, X is bromine, m is 4, R3 is hydrogen and Y is a methylene diradical.

According to the present invention, polymeric flame retardants are prepared by reacting an anhydride-containing or anhydride-forming polymer or copolymer with one or more halogenated aromatic flame retardants containing a reactive hydrazido functionality (unsubstituted terminal nitrogen) of a Formula VI or III or mixtures thereof:

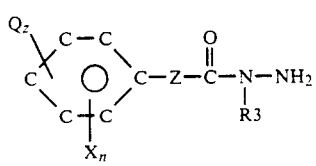

VI

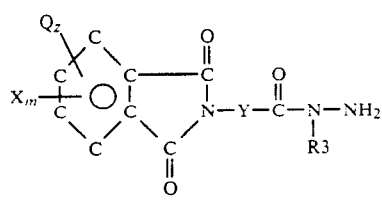

III wherein m, n, z, R3, Q, X, Y and Z are as previously defined. In the reaction, the flame retardants attach to the polymer or copolymer in the form of a substituted amide (amic acid) group or a substituted imide group.

Presently preferred hydrazides containing halogenated aromatic rings (Formula VI or III) which can be used to make the polymeric flame retardants of the present invention include, for example without limitation, the following illustrative compounds:

1. N-(2,4,6-trichlorophenyl)-N'-aminooxamide,
2. N-(2,4,6-tribromophenyl)-N'-amino succinamide,
3. N-(2,4,6-trichlorophenyl)-N'-aminosuccinamide,
4. N-(2,4,6-tribromophenyl)-N'-aminomalonamide,
5. N-(2,4,5-tribromophenyl)-N'-aminoadipamide,
6. N-(2,4,6-tribromophenyl)-N'-aminoazelamide,
7. N-(2,4-dibromophenyl)-N'-aminooxamide,
8. N-(2,4-dibromophenyl)-N'-succinamide,
9. N-(2,3,5,6-tetrachlorophenyl)-N'-aminooxamide,
10. N-(2-bromophenyl)-N'-aminooxamide,
11. N-(2-chlorophenyl)-N'-aminooxamide,
12. N-(2,3,4,5,6-pentabromophenyl)-N'-aminooxamide,
13. N-(2,3,4,5,6-pentabromophenyl)-N'-aminosuccinamide,
14. N-(2,3,4,5,6-pentachlorophenyl)-N'-aminooxamide,
15. 3-(2,4,6-tribromophenylamino)propionhydrazide,
16. 3-(2,4,6-trichlorophenylamino)propionhydrazide,
17. (2,4,6-tribromophenylamino)acetyl hydrazide,
18. (2,4,6-trichlorophenylamino)acetyl hydrazide,
19. (2,4,6-tribromophenoxy)acetyl hydrazide,
20. (2,3,4,5,6-pentabromophenoxy)acetyl hydrazide,
21. (2,3,4,5,6-pentachlorophenoxy)acetyl hydrazide,
22. 3-(2,4,6-tribromophenoxy)propionhydrazide,
23. 3-(2,3,4,5,6-pentabromophenoxy)propionhydrazide,
24. (tetrachlorophthalimido)acetyl hydrazide,
25. 3-(tetrabromophthalimido)propionhydrazide,
26. 3-(tetrachlorophthalimido)propionhydrazide, 27. 3-(tetrabromophthalimido)butanoic acid hydrazide,
28. 2-(tetrabromophthalimido)-4-methylmercaptobutanoic acid hydrazide,
29. 2-(tetrachlorophthalimido)-4-methylpentanoic acid hydrazide,
30. 2-(tetrabromophthalimido)-4-pentenoic acid hydrazide,
31. 3-bromo-4-methylbenzhydrazide,
32. 2,4-dichlorobenzhydrazide,
33. 2,3,4,5-tetrafluorobenzhydrazide,
34. 2-chloro-4-fluorobenzhydrazide, and
35. 2,4,5-tribromobenzhydrazide.

Halogenated aromatic flame retardants containing a reactive hydrazido functionality may be prepared using several reactions. For example, illustrative compounds 1-14 above may be prepared by reacting a halogenated aniline with a mono ester acid chloride of a dicarboxylic acid to form a N-halophenyl amic acid ester intermediate. The intermediate may then be reacted with hydrazine (hydrazinolysis of the ester group) to form the hydrazido flame retardant. This preparation may be illustrated by the following equations:

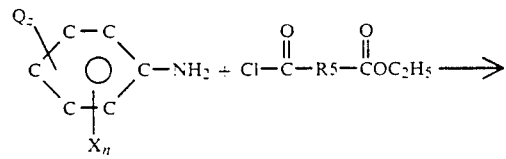

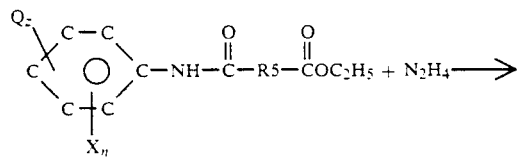

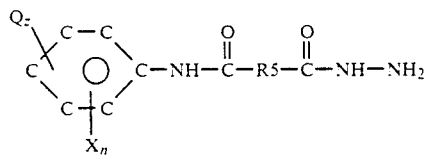

where Q, X, n, z and R5 are as previously defined.

In another example, which may be used to prepare illustrative compounds 15-23 above, halogenated aromatic flame retardants having a reactive hydrazido functionality, a lower alkyl ester of a halo-substituted acid may be reacted with a halogenated aniline, phenol or thiophenol to form a halophenylamino, halophenoxy or halothiophenoxy intermediate, respectively. The intermediate may then be converted by hydrazinolysis of the ester group to the corresponding hydrazide. These reactions may be illustrated by the following equations:

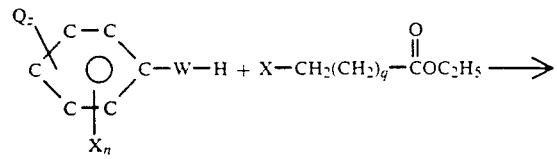

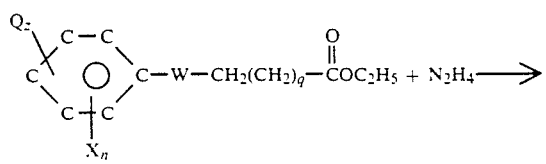

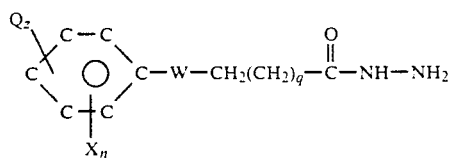

where q is an integer from 0 to 14, W is oxygen, sulfur or —N(R6)— and Q, X, n, z and R6 are as previously defined.

In still another example, which may be used to prepare illustrative compounds 24-30 above, novel flame retardants having a hydrazido functionality, useful to make the polymeric flame retardants of the present invention, may be prepared by reacting an amino acid ester with a halogenated phthalic anhydride to form a halophthalimido-substituted ester intermediate. This intermediate may be converted by hydrazinolysis of the ester group to the desired flame retardant hydrazide. This preparation is illustrated by the following equations:

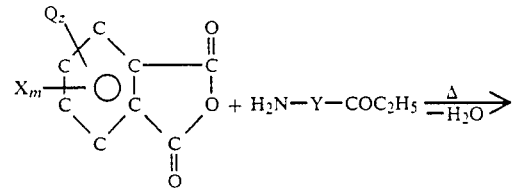

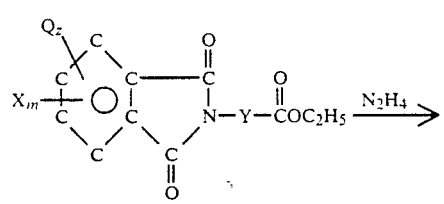

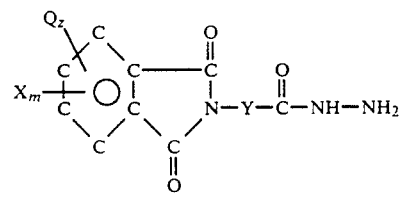

where Q, X, m, z and y are as previously defined.

In yet another example, which may be used to prepare illustrative compounds 31-35 above, novel flame retardants having a hydrazido functionality, useful to make the polymeric flame retardants of the present invention, may be prepared by hydrazinolysis of halogenated benzoic acid esters. This preparation is illustrated by the following equation:

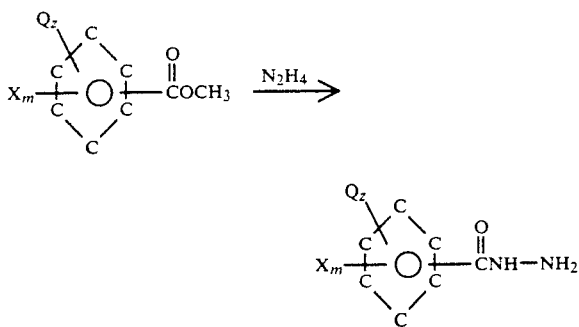

where Q, X, n and z are as previously defined. Based on the present disclosure, one skilled in the art may readily determine the reactants and methods desired to prepare the intermediate esters and the hydrazido flame retardants in accordance with the present invention without undue experimentation.

The polymeric flame retardants of the present invention can be made from diverse starting materials. Any polymeric anhydride group present in any level in any polymer, copolymer or blend system is a potential starting material for preparing the polymeric flame retardants of the present invention.

In general, the hydrazido-substituted halogenated aromatic flame retardants of the present invention may be attached to any polymer or copolymer containing pendant cyclic anhydride groups or dicarboxylic acid groups which can dehydrate to cyclic anhydride groups under the processing conditions described herein to prepare the polymeric flame retardants. The cyclic anhydride groups (or cyclic anhydride-forming groups) may be on the polymer backbone or grafted side chains. Generally, the polymeric flame retardants where X and n are as previously defined are prepared from anhydride polymers or copolymers with recurring units in the polymer backbone and/or as pendant units having the general Formula VII or VIII or both:

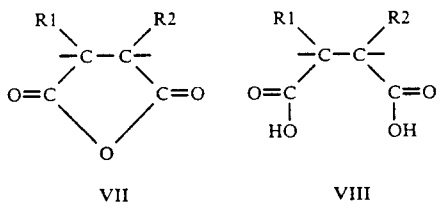

wherein R1 and R2 are as previously defined.

Bonding or attaching the hydrazido-containing halogenated aromatic flame retardant groups of the present invention to the cyclic anhydride-containing (or cyclic anhydride-forming) polymer in accordance with the present invention is based on the reaction of an anhydride with a hydrazide to yield an acylhydrazide and a carboxylic acid. Specifically, the cyclic anhydrides and hydrazides react to form a product which contains both acylhydrazido and carboxylic acid functional groups. The acylhydrazide is called an N-(acylamino)amide; the product is both an amide and carboxylic acid and is thus called an amic acid. If an amic acid is heated, further reaction occurs in which a molecule of water is lost and a ring is formed with two carbonyl groups attached to the amide nitrogen. This product is called an imide or, more precisely, an N-(acylamino)imide.

Depending upon the substitution of the anhydride and hydrazide, the formation of acylhydrazide and carboxylic acid and their subsequent conversion to imide occur under a wide range of reaction conditions, particularly reaction temperature and duration. Temperature is usually the dominant factor. Generally, below about 100° C., the amic acid will not convert to the imide without the aid of a co-reactant, such as acetic anhydride and sodium acetate. In some cases where the reaction temperature is not hot enough, the reaction may stop at the intermediate amic acid or only partial conversion of the amic acid to the imide may occur. However, above about 175° C. an amic acid, once formed, will begin to convert to the imide immediately. Higher reaction temperatures generally reduce the required reaction time for any particular system of reactants. Preferably, the reactions are carried out at temperatures of about 125° C. to about 275° C. Shorter reaction times are possible when running the reaction in the melt form in the absence of solvents.

At intermediate temperatures of about 100° C. to about 175° C., the reaction duration becomes very important and mixtures of amic acid and imide may result, the amount of each present depending upon the reaction duration. Preferably, the reaction occurs for a time of about 30 seconds to about 48 hours, depending upon the degree of conversion of the anhydride (or amic acid) to imide desired, the reactivity of the reactive flame retardant hydrazides, the reaction temperature employed, the presence or absence of a solvent and the use or non-use of a catalyst.

Generally, short reaction times and/or low reaction temperatures may lead to some uncyclized amic acid intermediates. Cyclization to the imides can be accomplished by raising the temperature above about 200° C. to about 230° C., either in the reaction step or a subsequent melt blending step with a host polymer or polymer blend, which is to be flame retarded by the polymeric flame retardants.

Reaction of the flame retardant aromatic compounds containing reactive hydrazido functional groups with anhydride containing polymers or copolymers may be carried out in inert solvents, such as toluene, xylene, chlorobenzene, mesitylene, dimethylformamide and tetrahydrofuran. However, the reactive flame retardant hydrazides are preferably reacted with the cyclic anhydride-containing or (cyclic anhydride-forming) polymers or copolymers by a melt blending step in the absence of a solvent and preferably in an inert atmosphere, such as nitrogen. This can be accomplished at a temperature above the softening point of the anhydride polymer or copolymer and below the decomposition temperature of the polymer or reactive flame retardant hydrazide using any conventional melt mixing apparatus, such as a plastograph, Banbury mixer, two roll mill, single or twin screw extruder or any other method which applies sufficient heat (e.g.: about 175° C. to about 300° C.) and shear to the ingredients to obtain a satisfactory blend.

When the flame retardants are reacted with the polymers in a mixer in the molten state, the blended product is preferably cooled, ground up in a grinder and dried in an oven at elevated temperatures, preferably under vacuum or an inert atmosphere. When the reaction is carried out in an extruder, the extrudate is cooled, either by an inert gas or by a cooling bath, dried if desired, pelletized or ground up and, if desired, redried in an oven. When the flame retardants are reacted with the polymers in solution, the polymeric products can be isolated by removal of the solvent or by precipitation of the product in a non-solvent, such as methanol or hexane. In the latter case, the product is preferably separated from the solvent, washed with fresh non-solvent and dried in an oven at elevated temperature, preferably under vacuum or an inert atmosphere.

One skilled in the art may readily determine the reactants and reaction conditions necessary or desirable to produce the polymeric flame retardants of the present invention in view of the disclosure herein and conventional methods and techniques for producing polymers, copolymers and polymer blends.

Due to cost and ease of preparation, the anhydride-containing polymers are preferably polymers or copolymers of maleic anhydride. Examples of preferred cyclic anhydride-containing or cyclic anhydride-forming copolymers which may be used according to the present invention include, but are not limited to (a) maleic anhydride adducts of hydrogenated polymers or copolymers; (b) styrene/maleic anhydride copolymers; (c) alternating copolymers of maleic anhydride and alpha-olefins; (d) copolymers of alkyl vinyl ethers and maleic anhydride; (e) maleic anhydride modified polyolefins; and (f) maleic anhydride adducts of ethylene/-propylene/diene terpolymer (EPDM). It will be apparent to one skilled in the art, however, that other suitable polymers containing cyclic anhydride groups or cyclic anhydride-forming groups may be used in accordance with the present invention.

(a) Maleic Anhydride Adducts of Hydrogenated Polymer or Copolymers

Generally, the maleic anhydride adduct polymers useful in this invention are polymeric products containing pendant succinic anhydride groups which are formed by reacting maleic anhydride with hydrogenated polymers of conjugated dienes or hydrogenated copolymers of conjugated dienes and vinyl aromatic hydrocarbons containing a residual unsaturation level of from about 0.5% to about 20% of their original unsaturation level prior to hydrogenation. The reaction is preferably conducted by heating a mixture of the maleic anhydride and hydrogenated polymer or copolymer containing residual unsaturation. The maleic anhydride adds to the unsaturation of the polymer to form the polymer product containing the pendant succinic anhydride groups. This polymer, by virtue of the pendant anhydride groups, can now be readily reacted with the aromatic flame retardant compounds containing hydrazido groups to form polymeric flame retardants according to the present invention.

The amounts of maleic anhydride employed in the reaction may vary considerably depending on the specific nature of the hydrogenated polymer and the properties desired in the final product. Preferably, the amount of maleic anhydride is about 0.1% to about 25% by weight relative to the total weight of maleic anhydride and hydrogenated polymer. More preferably, the amount of maleic anhydride is about 0.2% to about 5% by weight.

Various polymers of conjugated dienes and copolymers of conjugated dienes and vinyl aromatic hydrocarbons may be hydrogenated for use in preparing the maleic anhydride adduct component of the polymer compositions. Polymers of conjugated dienes which may be hydrogenated include polymers derived from one or more conjugated diene monomers. For example, polymers may be derived from a single conjugated diene, such as 1,3-butadiene (i.e., a homopolymer) or may be derived from two or more conjugated dienes, such as a copolymer of 1,3-butadiene and isoprene and a copolymer of 1,3-butadiene and 1,3-pentadiene. Copolymers that may be hydrogenated include random copolymers of conjugated dienes and vinyl aromatic hydrocarbons and block copolymers of conjugated dienes and vinyl aromatic hydrocarbons which exhibit elastomeric properties.

Examples of conjugated diene polymers and random and block copolymers of conjugated dienes and vinyl aromatic hydrocarbons that can be utilized in the invention are described in European Patent Application Publication No. 103 148, published Mar. 21, 1984, based on European Patent Application 83107732.6, filed Aug. 5, 1983. Many of these polymers and copolymers are commercially available and may be hydrogenated by a variety of well-established processes. Suitable hydrogenation processes are described in U.S. Pat. Nos. 3,113,986 and 4,226,952, for example.

The maleic anhydride adduct may be readily prepared by, for example, first forming a homogeneous mixture or solution of the maleic anhydride and the hydrogenated polymer or copolymer containing residual unsaturation and then reacting the resultant mixture under appropriate conditions of time and temperature. Examples of appropriate reaction conditions are given in European Patent Application Publication No. 103 148.

(b) Styrene/Maleic Anhydride Copolymers

Styrene/maleic anhydride copolymers are a preferable general class of compounds that may be used in accordance with the present invention. Such styrene/maleic anhydrides typically comprise alternating copolymers of styrene and maleic anhydride, or the nonequimolar copolymers containing less than about 50 mole percent of the anhydride monomer. One skilled in the art will appreciate, however, that other cyclic anhydride-containing or cyclic anhydride-forming polymers and copolymers may be used in accordance with the present invention. For example, styrene may be replaced in whole or in part by other vinyl aromatic monomers such as alpha-methylstyrene, nuclear methylstyrenes, ethylstyrene, isopropylstyrene, t-butylstyrene, chlorostyrenes, dichlorostyrenes, bromostyrenes, dibromostyrenes, vinylnaphthalene and the like.

Similarly, the maleic anhydride can be replaced in whole or in part by another alpha, beta-unsaturated cyclic dicarboxylic acid anhydride or anhydride-forming group, such as itaconic, aconitic, citraconic, mesaconic, chloromaleic, bromomaleic, dichloromaleic, dibromomaleic and phenylmaleic anhydride. Maleic anhydride is, however, presently preferred.

Styrene/maleic anhydride copolymers may also contain a termonomer, such as a $C_1$ to $C_3$ alkyl acrylate or methacrylate, acrylonitrile, methacrylonitrile, acrylamide, methacrylamide, acrylic acid or methacrylic acid. Rubber-modified terpolymers of styrene, maleic anhydride and lower alkyl ($C_1$ to $C_3$) methacrylates are described, for example, in U.S. Pat. No. 4,341,695. Incorporation of about 2% to about 20% by weight of such methacrylate comonomers generally increases the heat distortion temperature of the polymer, raises the tensile strength and increases the gloss of the rubber-modified polymer. These polymeric compositions may be prepared by dissolving the rubber in a solution of a monoalkenyl aromatic component and the methacrylate ester in a suitable solvent and then polymerizing the solution with the anhydride component in the manner described in, for example, U.S. Pat. Nos. 2,971,939, 3,336,267 and 3,919,354.

These cyclic anhydride-containing or anhydride-forming polymers or copolymers may be prepared by any of several methods available for the preparation of styrene/maleic anhydride copolymers or they may be purchased commercially. Non-equimolar copolymers may be prepared by solution polymerization directly from the respective monomers by the incremental addition of the reactive monomer as taught by U.S. Pat. No. 2,971,393; by a continuous recycle polymerization process, such as those described in U.S. Pat. Nos. 2,769,804 and 2,989,517; by the suspension polymerization process described in U.S. Pat. No. 3,509,110; or other suitable methods and techniques known in the art.

The styrene/maleic anhydride copolymers may also contain rubber-modified monomers in an amount of about 5 to about 40 percent by weight of the total polymer or elastomer. The rubber-modified monomers may be incorporated into the anhydride-containing or anhydride-forming copolymers by blending, mixing or copolymerizing the anhydride monomers in the presence of the rubber. Preferably, the elastomers are incorporated into the monomer mixture prior to polymerization using, for example, the method of U.S. Pat. No. 4,097,551 or U.S. Pat. No. 4,486,570 in which a mixture of at least two rubbery additives are present during the polymerization.

Examples of suitable rubber polymers or elastomers include conjugated 1,3-diene rubber, styrene/diene copolymer rubber, acrylonitrile/diene copolymer rubber, EPDM rubber, acrylate/diene copolymer rubber, and mixtures thereof.

Preferred rubber polymers include diene rubber, such as homopolymers of conjugated dienes having butadiene, isoprene, chloroprene, or piperylene, for example, and copolymers of such dienes with up to 50 mole percent of one or more copolymerizable mono-ethylenically unsaturated monomers, such as styrene, substituted styrenes, acrylonitrile, methacrylonitrile and isobutylene.

Examples of particularly suitable polymers are the high molecular weight, non-equimolar copolymers of styrene and maleic anhydride commercially available from ARCO Chemical Company, division of Atlantic Richfield Company under the name Dylark TM. In particular, Dylark TM copolymers include those of the 200 series and the 300 series and the Dylark TM 700 copolymer. Those copolymers designated Dylark TM 250, Dylark TM 350 and Dylark TM 700 are impact modified. The Dylark TM 250 resin, for example, comprises about 92% by weight styrene monomer and 8% maleic anhydride and is prepared in the presence of about 18 parts by weight Stereon TM rubber per 100 parts styrene and maleic anhydride.

In addition, low molecular weight styrene/maleic anhydride copolymers (MW 700–1900 daltons) manufactured by ARCO and sold under the name SMA TM, are particularly suitable polymers in accordance with the present invention. SMA TM resins 1000, 2000 and 3000 are particularly suitable.

Styrene/maleic anhydride copolymers or rubber modified styrene/maleic anhydride copolymers where a portion of the maleic anhydride groups is converted to maleimide groups or N-substituted maleimide groups, may also be used in accordance with the present invention. The partially imidated copolymers can be prepared, for example, by treating the SMA TM polymer with a primary amine in a post polymerization step, as described in U.S. Pat. No. 3,998,907, or during the polymerization as described in U.S. Pat. No. 4,381,373. Imidization should, however, not be allowed to occur in over about 80% of the anhydride groups to allow an adequate amount of sites to which flame retardant groups may be bound.

The formation of the maleimide groups on monomer units that do not contain flame retardant groups may be formed before, during or after the formation of the hydrazido linkages of the monomer units with the flame retardant groups. Amines suitable for imide conversion of the maleic anhydride include ammonia, primary alkyl amines and primary aryl amines. Generally, long chain primary alkyl amines will beneficially aid the flow properties of the system, while primary aryl amines will increase the thermal stability and heat distortion properties of the system. Aniline is a presently preferred amine for imidization, one which also increases the thermal stability of the polymer system.

The Cadon TM resins from Monsanto Chemical Co. are also suitable polymers which may be used in accordance with the present invention. Cadon TM is a commercial series of styrene/maleic anhydride polymer alloys or blends with acrylonitrile/butadiene/styrene (ABS). Rubber-modified versions of the Cadon TM type blends are also available from Monsanto.

Additional suitable polymers include the rubber-modified styrene maleic anhydride resins described in U.S. Pat. No. 4,522,983, where a nuclear-substituted methylstyrene is included in the composition in an amount sufficient to increase the impact strength of the composition.

Styrene/maleic anhydride polymers may also be modified by copolymerizing the monomers in the presence of other monomers, such as ethylenically unsaturated carboxylic acids (specifically acrylic and methacrylic acids, for example), acrylamide and methacrylamide, dialkylamino $C_1$ to $C_6$ alkylacrylates or methacrylates, such as dimethylaminoethyl acrylate or methacrylate, and vinyl esters derived from saturated carboxylic acids of 2 to 22 carbon atoms, such as vinyl acetate or vinyl propionate.

Other modification of the preferred styrene/maleic anhydride copolymers of the present invention may be accomplished by carrying out the copolymerization in the presence of crosslinking monomers having two or more ethylenically unsaturated double bonds, such as divinylbenzene, 1,4-butadiene, divinyl ether, ethylene glycol dimethacrylate, butanediol dimethacrylate, triallyl cyanurate and similar type compounds. Such crosslinking monomers are preferably employed in amounts of about 0.01% to about 5% by weight relative to the maleic anhydride. More preferably, the crosslinking monomers are present in an amount of about 0.1% to about 2% by weight.

(c) Alternating Copolymers of Maleic Anhydride and Alpha-Olefins

Alternating copolymers of maleic anhydride and alpha-olefins are well known in the art, and are exemplified by U.S. Pat. Nos. 3,553,177, 3,560,455, 3,560,456 and 3,560,457. Each of these patents describes a copolymer of maleic anhydride with a specific alpha-olefin, such as $C_{12}$ to $C_{30}$ alpha-olefins. The copolymers of $C_6$ to C₁₀ alpha-olefins are known as shown by U.S. Pat. No. 3,488,311. Terpolymers of maleic anhydride, having at least one lower alpha-olefin and at least one higher alpha-olefin as described in Canadian Patent 1,180,497, may also be used to form the polymer system.

Alternating copolymers of maleic anhydride and alpha-olefins may be prepared by conventional polymerization processes, such as those described in U.S. Pat. Nos. 3,553,177, 3,560,455, 3,560,456, 3,560,457 and 3,488,311. PA-18 (a product of the Chevron Chemical Co.) is an example of a commercially available alternating copolymer of maleic anhydride and octadecene-1 having a molecular weight of about 50,000 daltons, which may be used in accordance with the present invention.

Additional polymers suitable for use in this invention include the terpolymers disclosed in U.S. Pat. Nos. 4,522,992 and 3,723,375. These are basically terpolymers of cyclic alpha, beta-unsaturated dicarboxylic acid anhydrides, aromatic mono-alkenyl monomers and higher 1-alkenes. Preferably, such terpolymers comprise styrene, maleic anhydride and alpha-olefins having 10 or more carbon atoms. Both pure alkenes and mixed alkenes may be utilized in preparing the terpolymers.

(d) Copolymers of Alkyl Vinyl Ethers and Maleic Anhydride

Alternating copolymers of alkyl vinyl ethers and maleic anhydride are readily prepared in bulk or solution using free radical initiators, such as lauroyl peroxide (see British Patent 1,117,515). Low, medium and high molecular weight grades are commercially available. Commercial grades include the Gantrez ™ resins (available from General Aniline and Film). Suitable alkyl vinyl ethers for this invention include methyl, ethyl, propyl, isopropyl, n-butyl, isobutyl, amyl, isoamyl, hexyl, heptyl, octyl, 2-ethylhexyl, nonyl, decyl, dodecyl, hexadecyl and octadecyl vinyl ethers.

(e) Maleic Anhydride Modified Polyolefins

Maleic anhydride modified polyolefins, which may be employed in this invention to produce a polymeric flame retardant having the general Formula IX:

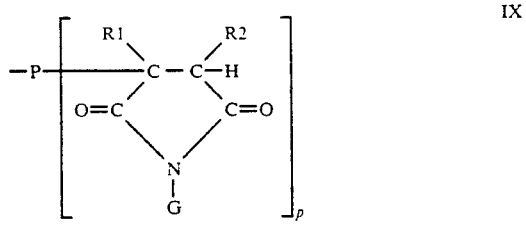

wherein
P- is a C₁ to C₆ olefin polymer residue,
p is the valence of the polymer; and
G, R1 and R2 are as previously defined. Preferably, P- comprises ethylene, propylene, butene or combinations thereof.

Such olefin polymers may be a high or a low density polyethylene residue, a polypropylene residue or a residue of a copolymer of ethylene with 1-butene, a residue of a copolymer of ethylene and propylene, a residue of a propylene/butene copolymer or a residue of such a propylene copolymer with an olefin having up to about six carbon atoms.

The maleic anhydride-modified polyolefins are known in the art and generally contain about 0.2% to about 9% by weight of combined maleic anhydride, and preferably, the polyolefins contain about 2% to about 5%. One example of such a polyolefin is "Hercoprime ™", sold by Hercules Inc., Wilmington, Del. In addition, polyethylene and polypropylene modified with maleic anhydride are available commercially from Enron Chemical Co. under the name "Plexar ™". Any polymer or copolymer of ethylene, propylene, or 1-butene can be modified via the maleic anhydride moiety to form the substrate molecule, including polyethylene, polypropylene, ethylene/propylene copolymer, propylene/butene-1 copolymer, or butene-1/ethylene copolymer, for example. A presently preferred maleic anhydride modified polyolefin has a Formula IX, where P is polypropylene, R1 and R2 are hydrogen, and p is about 0.005 to 0.04 per propylene repeat unit in P.

The preparation of maleic anhydride modified polypropylene is described in U.S. Pat. No. 3,483,276, for example. Briefly, the preparation consists of treating the olefin polymer to induce the formation of active, free radical sites thereof with which maleic anhydride can react. Active olefin polymer sites can be induced, for example, by subjecting the polymer to the action of high energy ionizing radiation such as gamma rays, X-rays, or high speed electrons; by contacting the polymer with a free radical producing material, such as dibenzoyl peroxide, dilauroyl peroxide, dicumyl peroxide or t-butyl perbenzoate either in solid form or in solution; or by simply milling the polymer in the presence of air. Preferably, the polyolefin is reacted with maleic anhydride in solution in the presence of a free radical initiator.

The olefin polymer-based maleimides of the invention are prepared by graft modifying the appropriate polymer backbone with a maleic anhydride and thereafter reacting the anhydride modified olefin polymer with halogenated aromatic compounds containing hydrazido functional groups.

The graft modification of EPDM by maleic anhydride in the presence of dicumyl peroxide and benzoyl peroxide is described by DeVito, et al., *J. Polym. Sci., Polym. Chem. Ed.*, 22:1335 (1984).

An additional grafting procedure is described in U.S. Pat. No. 4,506,056. In this patent, maleic anhydride is grafted onto molten polymers or copolymers using a free radical catalyst in which crosslinking or degradation of the polymers is controlled or eliminated in the presence of scavengers which inhibit the homopolymerization of maleic anhydride.

(f) Maleic Anhydride Adducts of Ethylene/Propylene/Diene Terpolymer (EPDM)

Maleic anhydride adducts of EPDM are prepared by the thermal addition of maleic anhydride to elastomeric copolymers of ethylene and propylene which have a substantially saturated hydrocarbon backbone chain and unsaturated hydrocarbon side-chains. The preparation of these adducts is described in U.S. Pat. No. 3,884,882.

Examples of other suitable anhydride copolymers include, but are not limited to: (1) vinyl acetate/maleic anhydride copolymer; (2) ethylene/vinyl acetate/maleic anhydride terpolymer; (3) isobutylene/maleic anhydride copolymer; (4) graft polyols containing styrene/maleic anhydride copolymer in the grafted chain; (5) styrene/maleic anhydride-2,4,6-tribromophenyl acrylate terpolymer; (6) maleic anhydride/divinylbenzene/styrene terpolymer; (7) ethylene/maleic anhydride/styrene graft copolymer; (8) methyl methacrylate/maleic anhydride copolymers; (9) butyl methacrylate/maleic anhydride/styrene copolymer; and (10) ethylene/maleic anhydride copolymers (manufactured by Monsanto Chemical Co.).

Other suitable maleic anhydride copolymers include the terpolymers of anhydrides, aromatic mono-alkenyl monomers and higher 1-alkenes described in U.S. Pat. No. 4,522,992; the tribromophenyl acrylate/epichlorohydrin/maleic anhydride-styrene copolymer described in U.S. Pat. No. 4,108,943; the methyl methacrylate/maleic anhydride-styrene copolymers disclosed in Japanese Patents 59/221,314 (CA 102:150317x) and 59/221,315 (CA 102:150318y); divinyl ether-maleic anhydride copolymers from Adica Labs (Pivan); a polybutadiene-polystyrenemaleic anhydride terpolymer, referred to as Ricon TM 184/MA, a product of Colorado Chemical Specialties, Inc.; ethylene-vinyl acetate copolymer grafted with maleic anhydride such as Modic E 310 K, a product of Mitsubishi Chemical Industries Co; and a poly(maleic anhydride), such as Belcene, a product of Ciba-Geigy.

The polymeric flame retardants may be prepared in the presence of inert polymers such as HIPS (polybutadiene/styrene graft copolymers), ABS (polybutadiene/acrylonitrile-styrene graft copolymer), MBS (methyl methacrylate/butadiene/styrene terpolymer) SAN (styrene/acrylonitrile copolymer), ASA (acrylic-styrene-acrylonitrile terpolymer), polystyrene, polyolefins, various copolymers of polystyrene and rubbery materials, poly(phenylene oxide), poly(phenylene ether) and various combinations thereof.

These stabilized polymer alloys or blends can be prepared in solution or in a melt blending step in any conventional melt mixing apparatus, such as a Banbury mixer or an extruder. In addition, once the flame retardants are bonded or attached to the anhydride polymers or copolymers, the modified anhydride polymer or copolymer (or modified anhydride polymer or copolymer blend) may be blended with polymers or copolymers containing reactive carbonyl groups, such as nylon, polycarbonate, polyesters and polyarylates.

The anhydride polymers or copolymers may be partially imidized with ammonia, primary alkyl or aromatic amines and the residual anhydride groups either totally or partially reacted with the reactive flame retardants to form maleimide groups. Likewise, the anhydride polymers or copolymers may be reacted with the hydrazido flame retardants first and then the residual anhydride groups either totally or partially reacted with ammonia, primary alkyl or aromatic amines. In addition, the anhydride copolymers may be reacted simultaneously with the reactive flame retardants and the primary amines. Residual carboxyl or anhydride groups may also be reacted with aqueous bases or metallic oxides to form ammonium or metal salts along the polymer. Care must be taken, however, to avoid saponification of the flame retardant groups.

These reactions may be desired to enhance various properties of the polymer system. For example, the anhydride polymers or copolymers may be partially imidized with other functionalized amines or hydrazides which will add additional properties to the polymers or copolymers, including Jeffamines TM (primary amine terminated block copolymers of ethylene oxide and propylene oxide produced by Texaco Chemical Co.), which contribute advantageous mold release properties to the polymers or copolymers; trialkoxysilylalkylamines, such as aminomethyltrimethoxysilane, 3-aminopropyltriethoxysilane or 3-aminopropyltri(n-propyloxy)silane (disclosed in U.S. Pat. No. 3,755,354), which enhance the ability of the polymer or copolymer system to accept fillers; and 3-dimethylaminopropylamine, which when reacted with the anhydride copolymers forms the 3-dimethylaminopropylimide, which when subsequently quarternizing the dimethylaminopropyl group with an alkyl halide, such as methyl iodide (as described in U.S. Pat. No. 3,555,001), introduces antistatic properties to the polymer system.

The polymeric flame retardants may be incorporated into end-use applications differently depending upon the composition of the polymer system being modified. For example, if it is desired to flame retard a polymer, copolymer or blend that contains a limited number of polymer-bound cyclic anhydride groups, part of the available anhydride groups can be transformed into the polymeric flame retardants of the present invention by simply adding the hydrazido-functionalized flame retardant and allowing the polymeric flame retardant to form during compounding, molding or curing of the polymer system. This is referred to as preparing the polymeric flame retardant at a minimum effective use level.

Alternately, an anhydride-containing polymer, copolymer or blend may be modified with hydrazide-functionalized flame retardant at a high level (reacting up to 100% of the available anhydride groups present). This polymeric flame retardant can then be referred to as a concentrate or masterbatch, which can be used as an additive, lending nonflammability to another polymer system. An example of this would be the reaction of a hydrazido-containing flame retardant with an alternating copolymer of maleic anhydride and an alpha-olefin (a copolymer with a high level of anhydride content). A polymeric flame retardant could be formed by converting 80–100% of the anhydride groups into imides bearing halogenated aromatic functionality. The polymeric flame retardant thus formed could then be used as an additive in a polymer system which did not originally contain anhydride groups, such as acrylonitrile/butadiene/styrene terpolymer, for example. It will be apparent in view of this disclosure to one skilled in the art that numerous possibilities exist for this technology in other systems wherein polymer bound anhydride provides sufficient sites for formation of polymeric flame retardant species.

The nonflammability properties of a polymeric flame retardant and a polymer composition including the polymeric flame retardants of the present invention may be controlled by the selection of the halogen and adjustment of the degree of halogenation of the flame retardant hydrazide. The amount of halogen introduced into the polymeric flame retardant can be further adjusted by the amount of anhydride groups converted to N-(acylamino)imide groups. According to the present invention, the end-use polymer, copolymer or blend is rendered less flammable by incorporation of the polymeric flame retardant in an amount sufficient to improve the flame retarding characteristics of the polymer system.

For example, in one embodiment of the present invention, an anhydride-containing or anhydride-forming polymer or copolymer is modified so that it contains about 2% to about 30% halogen by weight relative to total weight of the polymer. More preferably, the copolymer contains about 3% to about 12% halogen by weight.

The polymeric flame retardants of this invention can be blended with thermoplastic resins to act as a flame retardant additive for the thermoplastic resin. Generally, the amount of the polymeric flame retardant (with or without flame retardant enhancing agents) employed when blended with a thermoplastic resin is that amount required to effectively enhance the flame retardant properties of the thermoplastic resin upon molding compared with the flame retardant properties of the thermoplastic resin in the absence of the polymeric flame retardant. When employed as a flame retardant component in a thermoplastic composition, the polymeric flame retardants of the present invention are preferably present in an amount of about 5% to about 95% by weight relative to the weight of the total composition. More preferably, the polymeric flame retardants are present in an amount of about 30% to about 70% by weight. Typically, the bromine, fluorine and/or chlorine bound to the polymer will be present in an amount of about 5 to about 30 weight percent of the total composition.

One example of a method of forming an intimate mixture or blend of the polymeric flame retardant and the thermoplastic resin comprises dry blending the compounds with the polymers in a finely divided state. Subsequent molding or extrusion of this blend can then result in a substantially homogeneous composition. The polymeric flame retardant polymers are preferably blended with suitable thermoplastic resins in the molten state at a temperature of about the melting point of the polymer to a temperature just below the decomposition temperature of the polymer. This can be accomplished in a melt mixing apparatus, such as an extruder or Banbury mixer.

Examples of thermoplastic resins whose nonflammability properties can be enhanced by blending an effective amount of the polymeric flame retardants of this invention include, but are not limited to the following:

(1) polyolefins, such as high, low and linear low density polyethylene, which may be optionally crosslinked, polypropylene, polyisobutylene, poly(methylbutene-1), polyacetylene and polyolefins derived from monomers having about 2 to about 10 carbon atoms and mixtures thereof;

(2) polyolefins derived from diolefins such as polybutadiene and polyisoprene;

(3) copolymers of mono or diolefins such as ethylene propylene, propylene/butene-1, propylene/isobutylene and ethylene/butene-1 copolymers;

(4) terpolymers of ethylene and propylene with dienes (i.e., EPDM), such as butadiene, hexadiene, dicyclopentadiene and ethylidenenorbornene;

(5) copolymers of alpha-olefins with acrylic or methacrylic acids or their derivatives, such as ethylene/acrylic acid, ethylene/methacrylic acid and ethylene/ethyl acrylate copolymers;

(6) styrenic polymers, such as polystyrene (PS) and poly(p-methylstyrene);

(7) styrenic copolymers and terpolymers, such as styrene/butadiene (SBR), styrene/allyl alcohol and styrene acrylonitrile (SAN), styrene/acrylonitrile/methacrylate terpolymer, styrene/butadiene/styrene block copolymers (SBS), (8) rubber modified styrenics, such as styrene/acrylonitrile copolymers modified with acrylic ester polymers (ASA);

(9) graft copolymers of styrene on rubber, such as polybutadiene (HIPS), polyisoprene or styrene/butadiene/styrene block copolymers (Stereon TM products available from Firestone Synthetic Rubber and Latex Co.);

(10) graft copolymers of styrene/acrylonitrile on rubber, such as butadiene (ABS);

(11) graft copolymers of styrene/methyl methacrylate on rubber, such as polybutadiene, butadiene/styrene radial block copolymers (e.g. KRO 3 of Phillips Petroleum Co.), selectively hydrogenated butadiene/styrene block copolymers (e.g. Kraton G from Shell Chemical Co.) and mixtures thereof;

(12) polymers and copolymers derived from alpha, beta-unsaturated acids, anhydrides, esters, amides and nitriles or combinations thereof, such as polymers or copolymers of acrylic and methacrylic acids, alkyl and/or glycidyl acrylates and methacrylates, acrylamide and methacrylamide, acrylonitrile, maleic anhydride, maleimide, including various blends and mixtures thereof as well as rubber modified versions thereof;

(13) polymers and copolymers derived from unsaturated alcohols or their acylated derivatives, such as poly(vinyl alcohol), poly(vinyl acetate), poly(vinyl stearate), poly(vinyl benzoate), poly(vinyl maleate), poly(vinyl butyral), poly(allyl phthalate), poly(allyl diethylene glycol carbonate) (ADC), ethylene/vinylacetate copolymer and ethylene/vinyl alcohol copolymers;

(14) polymers and copolymers derived from unsaturated amines, such as poly(allyl melamine);

(15) polymers and copolymers derived from epoxides, such as polyethylene oxide, polypropylene oxide and copolymers thereof as well as polymers derived from bis glycidyl ethers;

(16) poly(phenylene oxides), poly(phenylene ethers) and modifications thereof containing grafted polystyrene or rubber as well as their various blends with polystyrene, rubber modified polystyrenes or nylon;

(17) polycarbonates and especially the aromatic polycarbonates, such as those derived from phosgene and bisphenols such as bisphenol-A, tetrabromobisphenol-A and tetramethylbisphenol-A;

(18) polyesters derived from dicarboxylic acids and diols and/or hydroxycarboxylic acids or their corresponding lactones, such as polyalkylene phthalates (e.g.: polyethylene terephthalate (PET), polybutylene terephthalate (PBT) and poly(1,4-dimethylolcyclohexane terephthalate or copolymers thereof) and polylactones, such as polycaprolactone;

(19) polyarylates derived from bisphenols (e.g. bisphenol-A) and various aromatic acids, such as isophthalic and terephthalic acids or mixtures thereof;

(20) aromatic copolyester carbonates having carbonate as well as ester linkages present in the backbone of the polymer, such as those derived from bisphenols, iso and terephthaloyl chlorides and phosgene;

(21) polyurethanes and polyureas; polyacetals, such as polyoxymethylenes and polyoxymethylenes, which contain ethylene oxide as a comonomer;

(22) polysulfones, polyethersulfones and polyimidesulfones;

(23) polyamides and copolyamides which are derived from diamines and dicarboxylic acids and/or from aminocarboxylic acids or the corresponding lactones, such as nylons 6, 6/6, 6/10, 11 and 12;

(24) polyimides, polyetherimides, polyamideimides and copolyetheresters;

(25) cross-linked polymers which are derived from aldehydes from phenols, ureas and melamine, such as phenol/formaldehyde, urea/formaldehyde and melamine/formaldehye resins;

(26) alkyl resins such as glycerol-phthalic acid resins and mixtures thereof with melamine-formaldehyde resins;

(27) unsaturated polyester resins which are derived from copolyesters of saturated and unsaturated dicarboxylic acids with polyhydric alcohols as well as from vinyl compounds as crosslinking agents and also the halogen-containing, flame resistant modifications thereof; and

(28) natural polymers, such as natural rubber, cellulose and chemically modified homologous derivatives thereof, such as cellulose acetates, cellulose propionates, cellulose butyrates and the cellulose ethers, such as methyl and ethyl cellulose.

The polymeric flame retardants of this invention may also be used to flame retard various combinations or blends of the polymers or copolymers discussed above.

The polymeric flame retardants of the present invention are particularly useful in the flame retardation of polyolefins, acrylic coatings, styrenics, rubber modified styrenics, poly(phenylene oxides) and various blends thereof with styrenics, rubber-modified styrenics or nylon.

The flame retardant group bonded to the cyclic anhydride-containing (or cyclic anhydride-forming) polymer or copolymers of this invention provide improved, substantially permanent non-flammability properties to the polymers or copolymers over the corresponding polymers or copolymers without the bonded flame retardants. Polymer bound flame retardants prepared according to the present invention by the reaction of a halogenated aromatic group containing a reactive hydrazido group with some or all of the anhydride groups of the polymer or copolymer to form pendant substituted imide groups (or amic acid groups which are capable of cyclizing to imide groups under the temperature processing conditions in accordance with the present invention) are generally not lost from the polymer system by volatilization, migration or extraction, even at high temperatures. In addition, the flame retardant groups are attached to the anhydride functions of the polymer through N-(acylamino)imide or diacyl hydrazide functional groups, which attachment contributes substantially permanent heat stabilizing and metal deactivating properties to the polymer.

In addition, the flame retardant polymers according to the present invention are thermally stable and are resistant to fragmentation under the high temperature processing conditions employed with engineering thermoplastics, such as polycarbonate and styrene/poly(phenylene oxide) blends.

Other additives may be desired to further enhance the properties of the finished polymer. Examples of other additives that can be used in conjunction with the flame retardants of this invention include antioxidants, such as alkylated monophenols, alkylated hydroquinones, hydroxylated thiodiphenyl ethers, alkylidenebis(phenols), hindered phenolic benzyl compounds, acylaminophenols, esters of 3-(3,5-di-t-butyl-4-hydroxyphenyl)-propionic acid, esters of 3-(5-t-butyl-4-hydroxy-3-methylphenyl)propionic acid, 3-(3,5-di-t-butyl-4-hydroxyphenyl)propionic acid amides; UV absorbers and light stablizers, such as 2-(2'-hydroxyphenyl)-2H-benzotriazoles, 2-hydroxybenzophenones, benzylidene malonate esters, esters of substituted or unsubstituted benzoic acids, diphenyl acrylates, nickel chelates, oxalic acid diamides, hindered amine light stabilizers; and other additives including metal deactivators, phosphites and phosphonites, peroxide decomposers, fillers and reinforcing agents, plasticizers, lubricants, corrosion and rust inhibitors, emulsifiers, mold release agents, carbon black, pigments, fluorescent brighteners, additional organic and inorganic flame retardants, nondripping agents, melt flow improvers and antistatic agents. Numerous examples of suitable additives of the above type are given in Canadian Patent 1,190,038. In view of the present disclosure, one skilled in the art may readily determine which additives are desired for a particular product and can readily incorporate such additives using methods and techniques known in the art.

Further in accordance with the present invention, it may be desirable to add flame retardant synergists or enhancing agents to the polymeric flame retardants of the present invention to further enhance their nonflammability properties. Generally, the use of an enhancing agent would reduce the amount of flame retardant groups required to obtain effective nonflammability properties of the anhydride polymer or copolymer to which the flame retardant groups are attached. Consequently, the degree of modification of the anhydride copolymer with the flame retardant hydrazide could be reduced by incorporating a flame retardant enhancing agent. Examples of such enhancing agents include antimony trioxide, antimony pentoxide, arsenic trioxide, arsenic pentoxide, zinc sulfate, zinc oxide, zinc borate, bismuth oxide, molybdenum oxide, tungsten oxide, stannous oxide and the like and their mixtures. One particularly preferable enhancing agent is antimony trioxide.

If desired, the flame retardancy can be further enhanced by the addition of halogented flame retardants, such as chlorinated paraffins, Dechlorane Plus and decabromodiphenyl oxide (see generally Kirk-Othmer, Encyclopedia of Chemical Technology, 3rd Ed., Vol. 10, at 384–87); small amounts of alkali metal sulfonic acid salts; or alkali metal carboxylic acid salts (see U.S. Pat. 4,578,409).

The enhancing agent is preferably present in an amount of about 1% to about 10% by weight relative to the total composition. More preferably, the enhancing agent is present in an amount of about 1% to about 5% by weight of the total composition.

For example, where an enhancing agent is employed, the flame retardant group attached to the polymer according to the present invention to make the novel flame retardant polymers may be present in an amount of about 5% to about 95% by weight; more preferably, from about 10% to about 30% by weight. It should be noted that the optimum level of polymeric flame retardant and optional enhancing agent used to make the polymeric flame retardant of the present invention depends upon the particular polymer substrate as well as the level of flame retardancy desired. Typically, the bromine, fluorine and/or chlorine bound to the polymer will be present in an amount of about 2 to about 20 weight percent of the total composition.

The invention will now be illustrated in further detail by reference to the following specific, non-limiting examples.

EXAMPLE 1

Preparation of Reactive Flame Retardant A

Potassium hydroxide (1.3 g, 0.02 mole) and potassium acetate (2.0 g, 0.02 mole) were placed in 75 ml acetic acid in a 250ml flask. This mixture was warmed until the salts dissolved. Glycine methyl ester hydrochloride (2.8 g, 0.022 mole) was added with no noticeable exotherm. This mixture was stirred briefly, and telrabromophthalic anhydride (9.3 g, 0.02 mole) was then added. This mixture was heated under reflux, becoming noticeably less turbid then opaque due to the precipitation of the product. Additional acetic acid (50 ml) was added to facilitate stirring. The mixture was refluxed for 1 hour. The mixture was cooled slightly and added to 70 ml water. The insoluble product was isolated by filtration, slurried with tetrahydrofuran and refiltered. Final removal of volatile components was done using a high vacuum. The yield of methyl(tetrabromophthalimido)acetate was 9.8 g having a melting point of 240°–243° C.

The ester prepared above (2.0 g, 0.004 mole) was slurried with 30 ml ethanol. To this 20 ml of 85% hydrazine hydrate were added. The resulting mixture was stirred at room temperature in a nitrogen atmosphere for 4 hours. The precipitate was isolated by filtration, warmed with 100 ml tetrahydrofuran and refilterd. The product, (tetrabromophthalimido)acetyl hydrazide (Flame Retardant A), (1.8 g) was a white solid. When attempting to determine the melting point, the sample began to yellow at 170° C. and decomposed above 280° C. Based on bromine content, the assay was 99+%. The infrared spectrum of this compound showed the imide carbonyl bands merged with the hydrazide carbonyl in the region 1630–1680 $cm^{-1}$. The ester carbonyl for the starting material (1740 $cm^{-1}$) was not observed in the product spectrum.

EXAMPLE 2

Reaction of Flame Retardant A with Octadecene/Maleic Anhydride Copolymer 5.6 g PA-18 (0.02 equivalents as maleic anhydride, hereinafter "anhydride equivalents") and 100 ml xylene were mixed in a 250 ml flask equipped with a nitrogen atmosphere and a Dean Stark trap. This mixture was refluxed for 30 minutes to dry the polymer. The mixture was cooled slightly and Flame Retardant A (of Example 1) (5.1 g, 0.01 mole) was added. The mixture was refluxed for 2 hours with azeotropic removal of water as it formed. The solvent was stripped using aspirator and high vacuum systems to yield 10.4 g of yellow crystals. The infrared spectrum of this compound showed the N-(acylamino)imide carbonyl bands merged at 1710 $cm^{-1}$ and a small residual anhydride carbonyl band at 1770 $cm^1$. The hydrazide carbonyl for the starting material was not observed in the product spectrum.

EXAMPLE 3

Reaction of Flame Retardant A with Styrene/Maleic Anhydride Copolymer 10.0 g Dylark TM 232 (0.011 anhydride equivalents) and 100 ml xylene we remixed in a 250 ml flask equipped with a nitrogen atmosphere and a Dean Stark trap. This mixture was refluxed for 30 minutes to dry the polymer. The mixture was cooled slightly and Flame Retardant A (of Example 1) (4.8 g, 0.009 mole) was added. The mixture was refluxed for 1 hour with azeotropic removal of water as it solidified and was transferred to a 1 liter flask with 350 ml of additional xylene. This mixture was refluxed as before for 2 additional hours. The solvent was stripped using an aspirator and a high vacuum. The resulting product was air dried for several hours then ground with a mortar and pestle. The result was 14.8 g of tan solid. This material was further dried in a vacuum oven for 5 hours resulting in 14.6 g of tan solid. The infrared spectrum of this compound showed the N-(acylamino)imide carbonyl bands merged at 1700 $cm^{-1}$ and a small residual anhydride carbonyl band at 1775 $cm^{-1}$. The hydrazide carbonyl for the starting material was not observed in the product spectrum.

EXAMPLE 4

Reaction of Flame Retardant A With Styrene/Maleic Anhydride Copolymer 20.0 g SMA TM 3000 (0.05 anhydride equivalents) and 300 ml xylene were mixed in a 1 liter flask equipped with a nitrogen atmosphere and a Dean Stark trap. This mixture was refluxed for 30 minutes to dry the polymer. The mixture was cooled slightly and Flame Retardant A (of Example 1) (3.6 g, 0.007 mole) was added. The mixture was refluxed for 2 hours with azeotropic removal of water as it formed. The cooled reaction mixture was poured into 600 ml of pentane which precipitated the polymer. The precipitated solid was isolated by filtration and dried under high vacuum to yield 15.6 g of slightly yellow crystals. Material which adhered to the sides of the reaction flask was isolated and weighed 7.4 g. (Total 23.0 g). The infrared spectrum of both compounds showed the N-(acylamino)imide carbonyl bands merged at 1710 $cm^{-1}$ and a small residual anhydride carbonyl band at 1770 $cm^{-1}$. The hydrazide carbonyl for the starting material was not observed in the product spectra.

EXAMPLE 5

Preparation of Reactive Flame Retardant B 2,4,6-tribromoaniline (66.0 g, 0.2 mole) and pyridine (24.0 g, 0.3 mole) were mixed in a 2 liter 3-neck flask equipped with a magnetic stirrer, thermometer, condenser and in addition funnel, and diluted with 600 ml of methylene chloride, giving a clear brown solution. Ethyl oxalyl chloride (27.5 g, 0.2 mole) dissolved in 40 ml methylene chloride was added to the stirring amine solution over approximately 7 minutes while holding the temperature at 24°–35° C. with a cold water bath. The reaction was stirred an additional 2 hours before washing twice with 200 ml portions of 10% hydrochloric acid (aqueous); once with 200 ml water and once with 200 ml saturated sodium bicarbonate solution. The methylene chloride solution was dried over anhydrous sodium sulfate, filtered and the methylene chloride stripped off under reduced pressure. The residue was a light, pinkish-tan powder weighing 85.5 g, and having a melting point of 111°–114° C. An infrared spectrum of the product showed a sharp NH peak at 3375 $cm^{-1}$, a strong carbonyl band at 1720 $cm^{-1}$ and a weak carbonyl peak at 1760 $cm^1$.

The product, ethyl N-(2,4 6-tribromophenyl)oxamate, was dissolved in 600 ml of methanol in a 3-neck 2 liter flask equipped with a mechanical stirrer, thermometer, condenser and addition funnel. 85% hydrazine hydrate (12.0 g, 0.204 mole) was added dropwise to the stirring methanol solution over 12 minutes while the temperature rose from 22° to 28° C. Half-way through the addition, solids began to form. A thick slurry formed by the end of the addition. An additional 150 ml of methanol were added and the reaction was stirred 1 hour at 25°-28° C. before filtering. The filter cake was semi-dried using an aspirator vacuum, slurried with 300 ml methyl t-butyl ether and refiltered. The filter cake was vacuum dried at 40°-50° C. The product, N-(2,4,6-tribromophenyl)-N'-aminooxamide (Flame Retardant B) was a white powder weighing 69.8 g having a melting point of 250°-254° C. The infrared spectrum of the product showed a sharp NH doublet at 3280 cm$^{-1}$, a strong carbonyl peak at 1675 cm$^{-1}$ and weak shoulders at 1708 and 1630 cm$^{-1}$. Bromine analysis indicated 57.2% bromine (theoretical 57.6%).

EXAMPLE 6

Reaction of Flame Retardant B with Styrene/Maleic Anhydride Copolymer 100 ml xylene were added to a 3-neck 250 ml flask equipped with a magnetic stirrer, thermometer, Dean Stark trap and a reflux condenser and heated in an oil bath to approximately 130° C. To the hot stirring xylene, 10 g of Dylark TM 232 (0.01 anhydride equivalents) were added in small portions. After the polymer had dissolved, Flame Retardant B (of Example 5) (3.15 g, 0.0075 mole) was added in small increments over 5 minutes. The aminooxamide was insoluble in the refluxing xylene but slowly went into solution as it reacted. The reaction was heated under reflux and azeotroped for 4.5 hours. A gelled material formed. The reaction mixture was cooled and 800 ml of methanol were added. The xylene-methanol mixture was decanted off and the sticky product was transferred to a Waring blender and ground up in 400 ml of fresh methanol. The fine particles that formed were filtered off and air dried. The dry product weighed 12.9 g. An infrared spectrum of the product showed that the anhydride peak of the starting copolymer had been reduced by about 75% and new carbonyl peaks at 1740 and 1710 cm$^{-1}$ had formed.

EXAMPLE 7

Reaction of Flame Retardant B with Styrene/Maleic Anhydride Copolymer

SMA TM 3000 (13.4 g, 0.0327 anhydride equivalents) and 300 ml xylene we remixed in a 3-neck 250 ml flask equipped with a magnetic stirrer, thermometer and Dean Stark trap with reflux condenser. The mixture was heated to approximately 100° C. to dissolve the polymer. Flame Retardant B (of Example 5) (8.4 g, 0.02 mole) was added to the hot solution in increments over abort 5 minutes. The reaction was heated to reflux and azeotroped for 2 hours. The reaction mixture was cooled to room temperature, transferred to a single neck 500 ml round bottom flask, and the xylene was stripped off under reduced pressure. The residue was scraped out of the flask, slurried in hexane, filtered and air dried on a watchglass. The dry product weighed 21.0 g. An infrared spectrum of the product in chloroform showed a moderate anhydride carbonyl band at 1775 cm$^{-1}$ and stronger carbonyl bands at 1730 cm$^{-1}$ (imide) and 1710 cm$^{-1}$ (amide).

EXAMPLE 8

Reaction of Flame Retardant B with Octadecene/Maleic Anhydride Copolymer

PA-18 (9.1 g, 0.0327 anhydride equivalents) and 130 ml xylene were mixed in a 3-neck 250 ml flask equipped with a magnetic stirrer, thermometer and Dean Stark trap with reflux condenser. The mixture was heated to approximately 110° C. Flame Retardant B (of Example 5) (8.4 g, 0.02 mole) was added to the hot solution in small increments over about 5 minutes. The reaction mixture was then heated to reflux and azeotroped for 2 hours. The reaction mixture was cooled to 100° C. and the solids present were filtered off and air dried (weight 1.4 g). The filtrate was transferred to a single neck 500 ml round bottom flask, and the xylene was stripped off under reduced pressure. The residue weighed 115.3 g. An infrared spectrum of the residue showed that the anhydride carbonyl band at 1775 cm$^{-1}$ had been reduced by about 70% and strong carbonyl bands at 1730 cm$^{-1}$ (imide) and 1705 cm$^{-1}$ (amide) were present. The insoluble material filtered from the hot xylene had neither an anhydride band nor an imide band and was discarded.

EXAMPLE 9

Extruder Reaction of Flame Retardant B with Styrene/Maleic Anhydride Copolymer

Flame Retardant B (of Example 5) was dry blended in a glass jar with Dylark TM 232 at three different concentrations: (i) 284.25 g (0.312 anhydride equivalents) Dylark TM 232 and 15.75 g (0.038 mole) Flame Retardant B; (ii) 268.5 g (0.295 anhydride equivalents) Dylark TM 232 and 31.5 g (0.076 mole) Flame Retardant B and iii) 247.5 g (0.272 anhydride equivalents) Dylark TM 232 and 52.5 g (0.127 mole) Flame Retardant B.

The attachment of the Flame Retardant B to the polymer was carried out in a Brabender Prep Center Extruder Model No. 1340 having a 1.25 inch screw diameter with a length-to-diameter ratio of 25:1. The extruder was operated at a screw speed of 25 rpm and all the heat zones were set at 260° C. The Dylark TM 232 was passed through the extruder first and a control sample of unmodified Dylark TM 232 was obtained. After the Dylark TM 232 stopped extruding, concentration (i) was added to the extruder hopper and extruded. The blend foamed as it came out of the extruder die due to the evolution of water vapor. The first portion of the foamed extrudate was discarded until a uniform extrudate was obtained. The extrudate was saved until the extrusion stopped. Concentrations (ii) and (iii) were extruded in the same manner. The extrudates from the control and the three concentration mixtures were ground up separately in a grinder.

Samples of the ground extrudates (0.5 g) were dissolved in 20 ml of warm chloroform and infrared spectra were taken. Concentration (i) gave a clear chloroform solution and the infrared spectrum contained a strong anhydride carbonyl band at 1775 cm$^{-1}$ and weak carbonyl bands at 1735 and 1705 cm$-1$. Concentration (ii) gave a cloudy solution in chloroform and the infrared spectrum showed a strong anhydride carbonyl band at 1775 cm$^{-1}$ and moderate carbonyl bands at 1735 and 1705 cm$^{-1}$. Concentration (iii) also produced a cloudy chloroform solution and in the infrared spectrum the carbonyl bands at 1735 and 1705 cm$^{-1}$ were almost as strong as the anhydride band at 1775 cm$^{-1}$. The extrudates were analyzed for bromine. Extrudate from concentration (i) contained 2.48% Br; extrudate from concentration (ii) contained 6.02% Br; and extrudate from concentration (iii) contained 8.99% Br. The extrudate from concentration (i) had a Tg of 120.0° C.; the extrudate from concentration (ii) had a Tg of 122.6° C.; and the extrudate from concentration (iii) had a Tg of 124.0° C. Unmodified Dylark TM 232 has a Tg of 120.6° C.

EXAMPLE 10

Attachment of Flame Retardant B to Dylark TM 232

The Flame Retardant B (of Example 5) was attached to Dylark TM 232 as in Example 9 except the reaction was carried out in a Brabender Prep Center Mixer at 220°–240° C. instead of in an extruder. The Dylark TM 232 was added to the mixer at 220° C. and mixed 5 minutes until completely melted. Flame Retardant B was added over 5 minutes and mixed one additional minute. During addition the temperature rose from 220° C. to 235°–240° C. Antimony trioxide in an amount equivalent to 4% of the total weight was then added over 3 minutes and the resin was mixed an additional 10 minutes at 230°–240° C. After the mixing period was over, the resin was backed out of the mixer and cooled. The resin was ground up in a grinder, assayed for bromine and Tg determined.

Two different resin compositions were prepared, preparation I containing approximately 6% bromine and preparation II containing approximately 10% bromine. A control was also run for comparison where Dylark TM 232 was heated by itself in the mixer at 220° C. for 15 minutes.

The ground up resin from preparations I and II and the control were injection molded in a Newbury 25 ton injection molding machine into 7⅜"×¾"×⅛" tensile bars. The tensile bars were in turn cut into 70 mm×6.5 mm×⅛" bars with a bandsaw. The oxygen index was then determined for each composition using ASTM Procedure D2863. The composition of the resins indicated by the amounts of starting material and the testing results are summarized in the following Table I.

The oxygen index increased as the percent attached bromine increased, indicating a higher concentration of oxygen required to support combustion and, hence, the flammability of the samples decreased as the degree of modification of the Dylark TM 232 increased. In addition, the Tg of the Dylark TM 232 increased as the degree of modification increased. This, in turn, indicates the modified polymers have greater thermal stability and higher heat deflection temperatures than the unmodified Dylark TM 232, which would be useful at higher temperatures than the unmodified Dylark TM 232.

TABLE I

| Preparation I | Dylark TM 232 | 200 grams (0.22 anhydride equivalents) |
|---|---|---|
|  | Flame Retardant B | 23.5 grams (0.057 mole) |
|  | Antimony Trioxide | 9.3 grams |
|  | % Bromine (Theoretical 6.0%) | Found 5.6% |
|  | Tg | 124.2° C. |
|  | Oxygen Index | 20 |
| Preparation II | Dylark TM 232 | 200 grams (0.22 anhydride equivalents) |
|  | Flame Retardant B | 42.4 grams (0.102 mole) |
|  | Antimony Trioxide | 10.1 grams |
|  | % Bromine | Found 5.6% |

TABLE I-continued

|  | (Theoretical 10.0%) |  |
|---|---|---|
|  | Tg | 127.8° C. |
|  | Oxygen Index | 23 |
| Control | Dylark TM 232 | 200 grams |
|  | Tg | 118.7° C. |
|  | Oxygen Index | 18 |

The present invention may be embodied in other specific form without departing from the spirit or essential attributes thereof and, accordingly, reference should be made to the appended claims, rather than the specification, as indicating the scope of the invention.

We claim:

1. A polymeric flame retardant comprising recurring units of N-(acylamino)amic acid or cyclic N-(acylamino)imide or both, wherein the recurring units include an acylamino group and a halogenated aromatic flame retardant group linked to the acylamino group.

2. The polymeric flame retardant according to claim 1, wherein the units comprise cyclic imide bonded to a halogenated aromatic group by an acylamino linkage.

3. The polymeric flame retardant of claim 1, further comprising recurring styrene monomer units in the polymer backbone, as pendant units or both.

4. A polymeric flame retardant comprising recurring units having a Formula I or II:

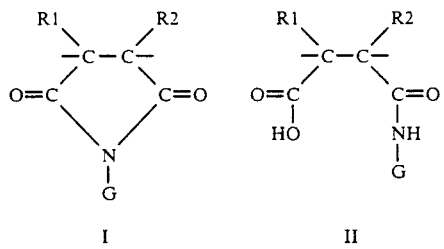

in which the units occur in the polymer backbone, as pendant units, or both, wherein R1 and R2 are independently hydrogen, an alkyl radical of 1 to 6 carbons, a cycloalkyl radical of 5 to 7 carbons, a phenyl radical chlorine or bromine; and G is a flame retardant group attached to the unit by an acylamino functional group having linked thereto a halogenated aromatic ring.

5. The polymeric flame retardant polymer according to claim 4, wherein G is a flame retardant group of Formula IV or V:

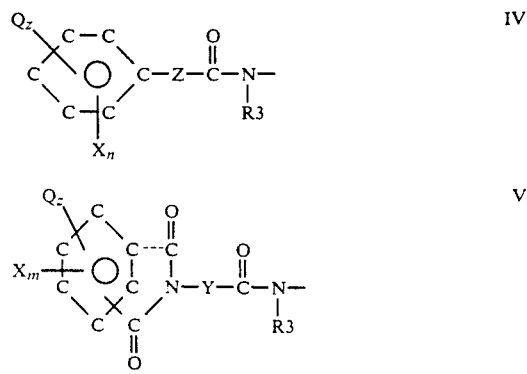

wherein m is an integer from 1 to 4;
n is an integer from 1 to 5;
z is an integer from 0 to 2;
Q is an alkyl radical of 1 to 4 carbons or an alkoxy radical of 1 to 4 carbons;
X is chlorine, bromine, fluorine or combinations thereof;
Y is a substituted or unsubstituted alkylene diradical of 1 to 12 carbons, a substituted or unsubstituted cycloalkylene diradical of 5 to 8 carbons, or a substituted or unsubstituted aralkylene diradical of 7 to 12 carbons, the group Y substituents being an alkyl radical of 1 to 4 carbons, a carboxy radical, an alkyl mercapto radical of 1 to 4 carbons, a phenyl radical, a halogen substituted phenyl radical, an alkenyl radical of 2 to 5 carbons or a hydroxy radical;
Z is a direct bond, an alkylene diradical of 1 to 4 carbons, —W—, —W—R4—, or —W—C(=O)—R5—,
where W is —O—, —S—, —N(R6)— or —N(R6)—R7—N(R6)—,
the orientation of Z being such that the left end of the diradical representational formula for Z above is bonded to the halogenated aromatic flame retardant group and the right end is bonded to the carbonyl carbon of the acylamino group;
R3 is hydrogen, a primary of alkyl radical of 1 to 8 carbons, a secondary alkyl radical of 3 to 8 carbons, an aralkyl radical of 7 to 12 carbons or a cycloalkyl radical of 5 to 12 carbons;
R4 is an alkylene diradical of 1 to 4 carbons;
R5 is a direct bond, an alkylene diradical of 1 to 14 carbons, an oxydialkylene diradical of 4 to 10 carbons, a thiodialkylene diradical of 2 to 10 carbons, or an o-, m-, or p-phylene diradical;
R6 is hydrogen, an alkyl radical having 1 to 10 carbons, an aryl radical of 6 to 12 carbons, an aralkyl radical of 7 to 12 carbons, or a cycloalkyl radical of 5 to 12 carbons; and
R7 is an alkylene diradical of 2 to 12 carbons.

6. The polymeric flame retardant of claim 5, wherein G is a flame retardant group of Formula IV; n is 2 or 3; z is 0; X is bromine or chlorine; R3 is hydrogen or methyl; Z is —W—R4— or —W—C(=O)—R5—; wherein W is —N(R6)— or —O—; R4 is a methylene diradical or an ethylene diradical; and R5 is a direct bond or an ethylene diradical and R6 is hydrogen or a methyl radical.

7. The polymeric flame retardant of claim 6, wherein n is 3; R3 is hydrogen; X is bromine; and Z is —W—C(=O)—R5—, wherein W is —N(R6)—, R5 is a direct bond; and R6 is hydrogen.

8. The polymeric flame retardant of claim 5, wherein G is a flame retardant group of Formula V; m is 3 or 4; z is 0; R3 is hydrogen or methyl; X is bromine or chlorine and Y is an alkylene diradical of 1 to 6 carbons.

9. The polymeric flame retardant of claim 8, wherein m is 4, R3 is hydrogen and Y is a methylene diradical.

10. The polymeric flame retardant according to claim 4, further comprising recurring styrene units in the polymer backbone, as pendant units or both, wherein the styrene monomer units are present in a non-equimolar amount relative to the monomer units of Formula I or II.

11. The polymeric flame retardant according to claim 10, wherein the styrene monomer units are present in an amount of about 92% and the monomer units of Formula I or II are present in an amount of about 8% by weight relative to the total styrene monomer units and monomer units of Formula I or II.

12. The polymeric flame retardant according to claim 4, further comprising modified polyolefins of Formula IX:

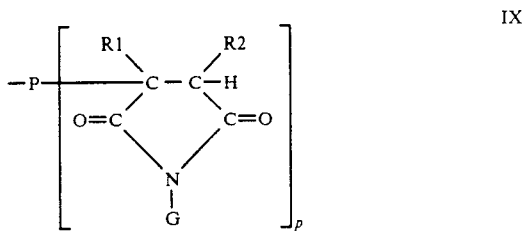

wherein P is a $C_1$ to $C_6$ olefin polymer residue, p is the valence of the polymer, and R1 and R2 are independently hydrogen, an alkyl radical of 1 to 6 carbons, a cycloalkyl radical of 5 to 7 carbons, a phenyl radical, chlorine or bromine.

13. The polymeric flame retardant according to claim 12, wherein the polyolefin comprises monomer units of ethylene, propylene, butene or combinations thereof.

14. A polymeric flame retardant having recurring units, the units comprising an N-(acylamino)amic acid or a cyclic N-(acylamino)imide or both, the N-(acylamino)amic acid or N-(acylamino)imide being formed by a reaction between a halogenated aromatic flame retardant group having a reactive hydrazido group and a polymer containing a cyclic anhydride group or a dicarboxylic acid group capable of forming a cyclic anhydride group under conditions effective to form the N-(acylamino)amic acid or cyclic N-(acylamino)imide or both.

15. A method for preparing a polymeric flame retardant having recurring units of Formula I or II or both:

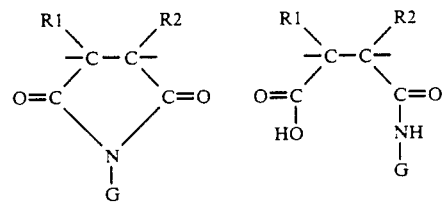

in which the units occur in the polymer backbone, as pendant units, or both, comprising reacting a polymer containing recurring units having a Formula VII or VIII or both:

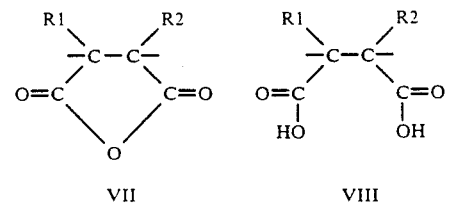

with a flame retardant compound having a reactive hydrazido functional group under conditions effective to form an acylhydrazido linkage with the unit, wherein in Formulas I, II, VII and VIII, R1 and R2 are independently hydrogen, an alkyl radical of 1 to 6 carbons, a cycloalkyl radical of 5 to 7 carbons, a phenyl radical, chlorine or bromine; and G in Formulas I and II is a flame retardant group attached to the unit by an acyl amino linkage.

16. The method according to claim 15, wherein the reactive flame retardant compound has a Formula VI or III:

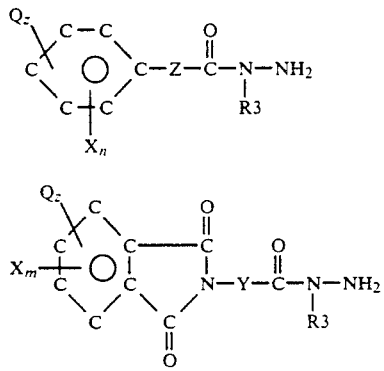

wherein m is an integer from 1 to 4;

n is an integer from 1 to 5;

z is an integer from 0 to 2;

R3 is hydrogen, a primary alkyl radical of 1 to 8 carbons, a secondary alkyl radical of 3 to 8 carbons, an aralkyl radical of 7 to 12 carbons or a cycloalkyl radical of 5 to 12 carbons;

Q is an alkyl radical of 1 to 4 carbons or an alkoxy radical of 1 to 4 carbons;

X is chlorine, bromine, fluorine or combinations thereof;

Y is a substituted or unsubstituted alkylene diradical of 1 to 12 carbons, a substituted or unsubstituted cycloalkylene diradical of 5 to 8 carbons, a substituted or unsubstituted aralkylene diradical of 7 to 12 carbons, the group Y substituents being an alkyl radical of 1 to 4 carbons, a carboxy radical, an alkyl mercapto radical of 1 to 4 carbons, a phenyl radical, a halogen substituted phenyl radical, an alkenyl radical of 2 to 5 carbons and a hydroxy radical;

Z is a direct bond, an alkylene diradical of 1 to 4 carbons, —W—, —W—R4— or —W—C(=O)—R5—, where W is —O—, —S—, —N(R6)—, or —N(R6)—R7—N(R6)—, the orientation of Z being such that the left end of the diradical representational formula for Z above is bonded to the halogenated aromatic flame retardant group and the right end is bonded to the carbonyl carbon of the acylamino group;

R4 is an alkylene diradical of 1 to 4 carbons;

R5 is a direct bond, an alkylene diradical of 1 to 14 carbons, an oxydialkylene diradical of 4 to 10 carbons, a thiodialkylene diradical of 4 to 10 carbons, an alkenylene diradical of 2 to 10 carbons, or an o-, m-, and p-phenylene radical;

R6 is hydrogen, an alkyl radical of 1 to 10 carbons, an aryl radical of 6 to 12 carbons, an aralkyl radical of 7 to 12 carbons, or a cycloalkyl radical having 5 to 12 carbons; and R7 is an alkylene diradical of 2 to 12 carbons.

17. The method according to claim 15, wherein the mixture is heated to about 125° C. to about 275° C.

18. The method according to claim 15, wherein the flame retardant group and the anhydride containing polymer are mixed for a period of time of about 30 seconds to about 48 hours.

* * * * *